May 1, 1923.
A. WILBERDING
PLANT PROTECTOR
Filed July 30, 1921   2 Sheets-Sheet 2
1,453,963
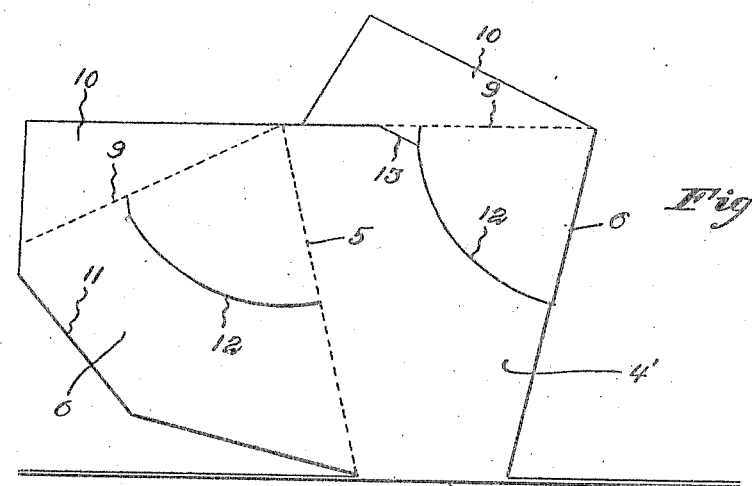
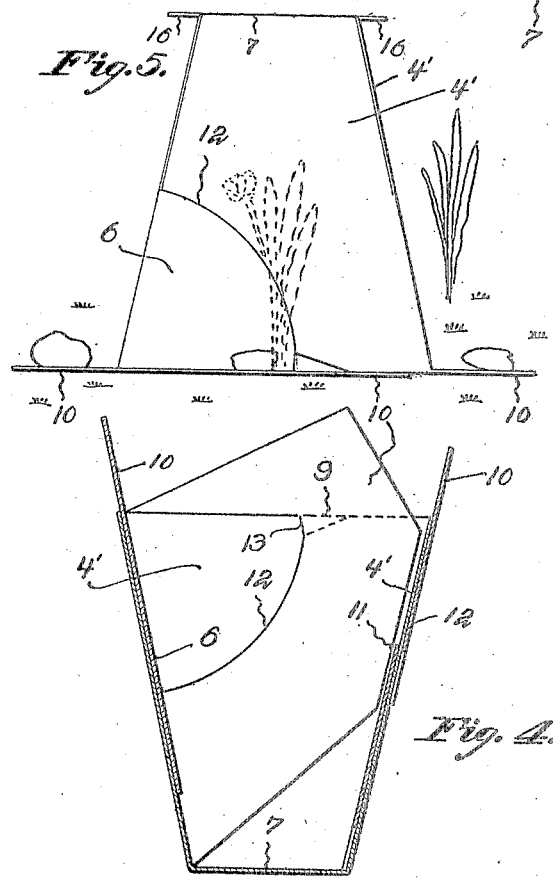
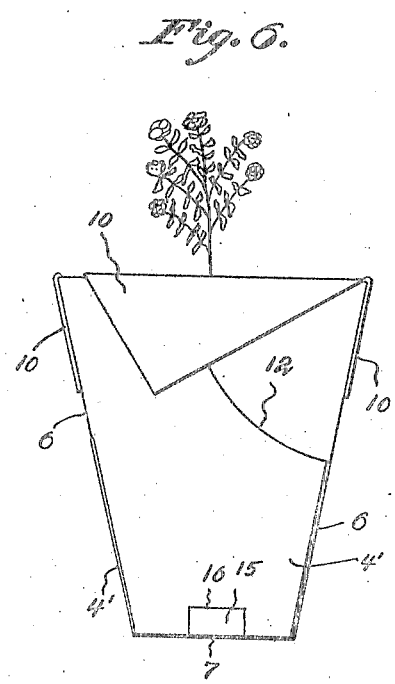
Inventor
Alfred Wilberding
By Victor J. Evans
Attorney
Witness:
J. M. Evans
L. B. Middleton Patented May 1, 1923.

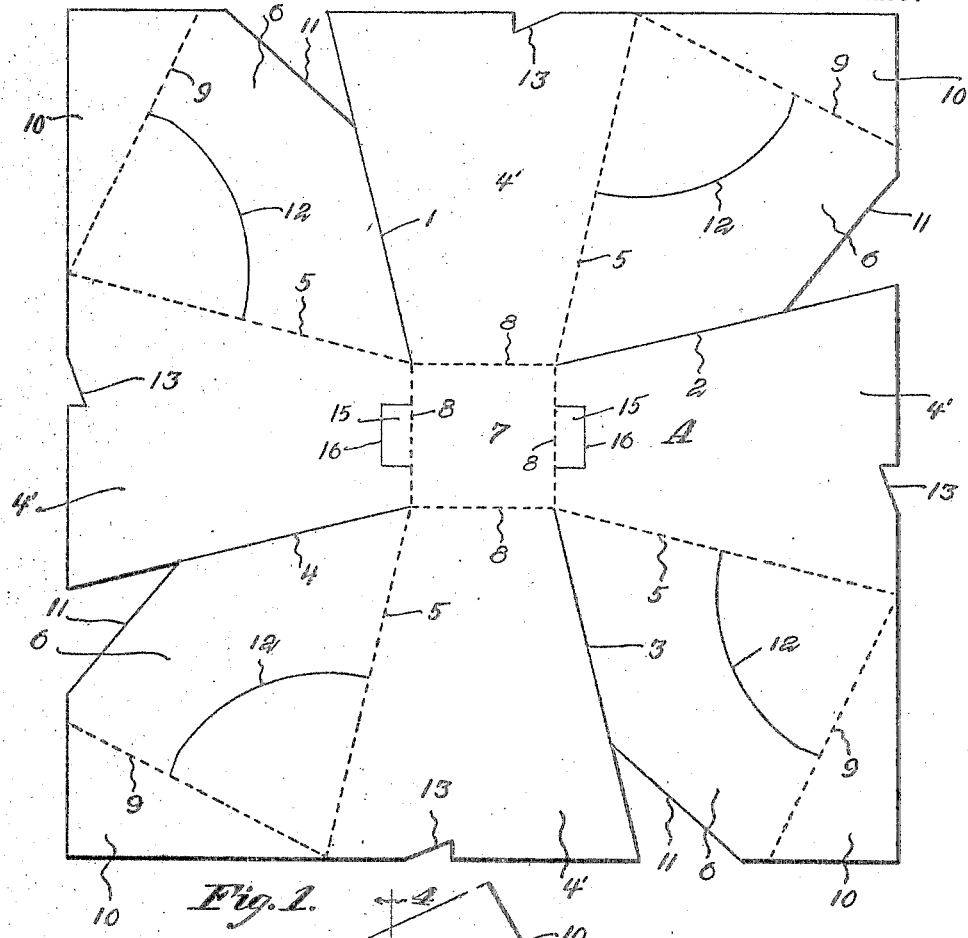

1,453,963

UNITED STATES PATENT OFFICE.

ALFRED WILBERDING, OF JACKSONVILLE, FLORIDA.

PLANT PROTECTOR.

Application filed July 30, 1921. Serial No. 488,670.

*To all whom it may concern:*

Be it known that I, ALFRED WILBERDING, a citizen of the United States, residing at Jacksonville, in the county of Duval and State of Florida, have invented new and useful Improvements in Plant Protectors, of which the following is a specification.

This invention relates to a collapsible container which is mainly designed for protecting plants from frost and the like though it may be used as a pot for a plant or for holding other articles or objects.

The general object of the invention is to form the device from a blank of card-board or similar material and to so cut this blank that it can be folded into a receptacle having tapering walls with the sides connected together by slots and notches.

Another object of the invention is to provide wings at the top of the receptacle which act to reenforce the sides and which may also be used to hold the device over the plant by covering the wings with dirt or the like or causing them to penetrate the ground.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a view of the blank from which the receptacle is formed.

Figure 2 is a view showing two of the sides connected together.

Figure 3 is a view similar to Figure 2 but looking towards the exterior of the box.

Figure 4 is a section on line 4—4 of Figure 2.

Figures 5 and 6 are views showing how the box can be used for protecting plants.

In these views the blank A from which the box is formed is cut on the lines 1, 2, 3 and 4 to form the four flaps 4'. Each flap is scored on the line 5 to provide each flap with an inner flap 6. This scored line with the cut line forms an outer flap which tapers towards the center and each outer flap is separated from the square center 7 by a scored line 8. Each inner flap is scored on the line 9 to form a wing 10 at the outer end of the inner flap. A piece is cut from each inner flap at its outer corner to form the edge 11 which will be in alignment with the scored line 5 of the overlapping outer flap when the box is in assembled condition. Each inner flap is provided with an arc-shaped slit 12 which extends from the scored line 5 to the scored line 9 and adjacent the scored line 9 the slit is made practically straight so that this part of the slit will be at right angles to the scored line 9. A saw-toothed notch 13 is made in the outer end of each of the outer flaps so that when the free outer corner of the outer flap is passed through the slit the straight wall of this notch will engage the wall of the straight part of the slit so as to lock the inner and outer flaps together.

It will thus be seen that the devices can be shipped and stored in flat condition so that large quantities can be shipped in comparatively small packages. The consumer or purchaser will assemble them and it is only necessary for him to place the corners of the outer flaps in the slits in the inner flaps and to insure the walls of the notches locking with the walls of the straight parts of the slits. This will lock the flaps together and produce a box, each side wall of which is of double thickness except at one lower corner. As before stated, this device is especially designed for being placed over plants for protecting them from frost and so forth. The wings can be bent downwardly so that they will penetrate the dirt and hold the box over the plant or they can be bent at right angles and dirt or stones placed upon them to hold the box in place.

It will also be apparent that the box can be used as a pot for plants or it can be used as a container. By folding the wings against the exterior sides they will act to reenforce the top of the box and hold the walls of the notches and slits in engagement.

When desired I may provide the device with ventilators 15 on two opposite sides which are formed by cutting the flap on three sides to form a flap 16, the fourth side of which is formed by the scored line 8 which separates the main flap from the center. This scored line acts as a hinge for the small flap 16. When the device is set over a plant these flaps 16 can be swung upwardly to permit the air to circulate through the device or if the weather is cold they can be lowered to close the ventilating openings.

When the flaps 16 are swung upwardly they will act as an awning to prevent the sun from entering the ventilating opening. When the device is used as a flower pot the flaps 16 can be closed or they can remain open as desired.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A device of the class described comprising a blank cut and scored to provide a plurality of inner and outer flaps forming walls of double thickness, each inner flap being connected by a scored line with one of the outer flaps, a wing on the outer end of each inner flap and means for locking the inner and outer flaps together, such means consisting of a slit in the inner flap for receiving a corner of the outer flap and a notch in the outer flap for engaging a part of the slit.

2. A receptacle of the class described comprising a bottom, a plurality of outer flaps connected with the bottom by scored lines, an inner flap connected with each outer flap by a scored line, a foldable wing on the outer end of each inner flap, said inner flap having an arc-shaped slit for receiving the corner of the outer flap and each outer flap having a notch in its outer end for engaging a part of the slit.

3. A device of the class described comprising a receptacle composed of a center portion and flaps hingedly connected with the center portion, means for detachably connecting the flaps together, one flap having a ventilating opening at its junction with the center and a small flap adapted to close said opening or be swung outwardly to uncover the opening.

In testimony whereof I affix my signature.

ALFRED WILBERDING.